United States Patent [19]

Koch

[11] Patent Number: 5,262,624

[45] Date of Patent: Nov. 16, 1993

[54] OPPOSITE SURFACE SCANNING OF A MARK SENSE FORM

[75] Inventor: Vernon F. Koch, Prior Lake, Minn.

[73] Assignee: National Computer Systems, Inc., Minneapolis, Minn.

[21] Appl. No.: 13,150

[22] Filed: Feb. 1, 1993

Related U.S. Application Data

[63] Continuation of Ser. No. 738,856, Jul. 31, 1991, abandoned.

[51] Int. Cl.$^5$ ............................................. G06K 7/10
[52] U.S. Cl. .................................. 235/456; 235/449; 235/454
[58] Field of Search ...................... 235/449, 454, 456

[56] References Cited

U.S. PATENT DOCUMENTS

| | | |
|---|---|---|
| 2,690,300 | 9/1954 | Wilson . |
| 3,163,746 | 12/1964 | Hoeser . |
| 3,227,884 | 1/1966 | Rantsch et al. . |
| 3,267,258 | 8/1966 | Bene . |
| 3,402,299 | 9/1968 | Held . |
| 3,578,953 | 5/1971 | Milford . |
| 3,983,364 | 9/1976 | Firehammer et al. . |
| 3,986,001 | 10/1976 | Saito . |
| 4,937,439 | 6/1990 | Wanninger et al. ................ 235/456 |

FOREIGN PATENT DOCUMENTS 8400832 3/1984 PCT Int'l Appl. .

OTHER PUBLICATIONS

Japanese Patent Abstract, vol. 006237, Publ. No. JP 57135414, published Nov. 25, 1982.

*Primary Examiner*—Harold Pitts

[57] ABSTRACT

A mark sense form and an optical mark reader operate together as an optical mark reading system to accomplish the opposite side scanning of the mark sense form. The opposite side scanning mark sense form comprises a sheet of material having a timing track preprinted on only one side of the sheet and one or more response areas located on the opposite side of the sheet, or on both sides of the sheet, in a predetermined relationship to one of the timing marks in the timing track. The response areas may have an associated response bubble printed as an outline for the user in selectively marking the mark sense form with data marks. The opposite side scanning optical mark reader comprises a first read head for scanning the timing track and response areas on one side of the form, a second read head for scanning response areas on the other side of the form and circuitry or software for producing an enabling signal from the timing track on the one side of the form such that the second scanner scans the response areas on the other side of the form in response to the enabling signal.

11 Claims, 10 Drawing Sheets

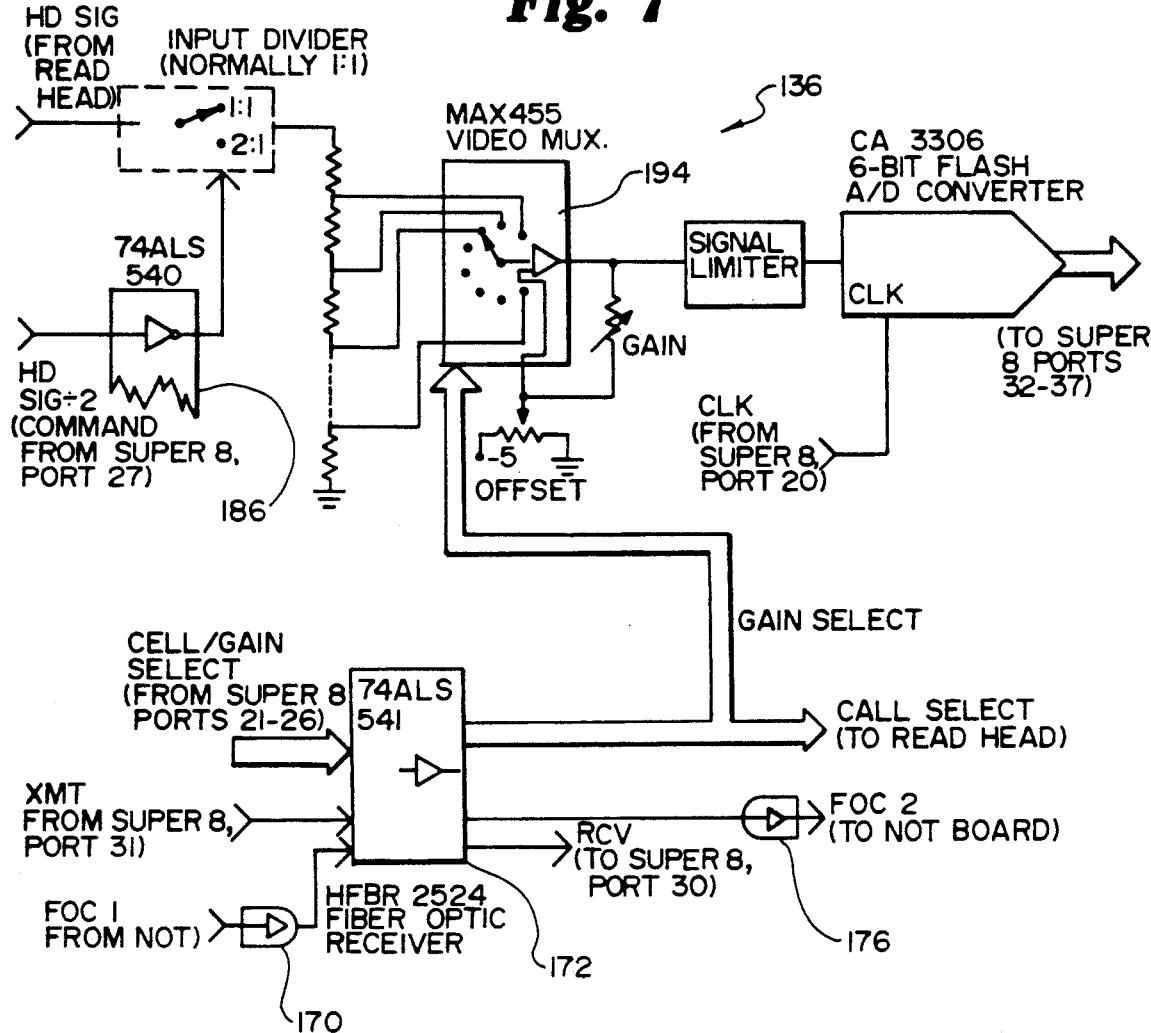
Fig. 7
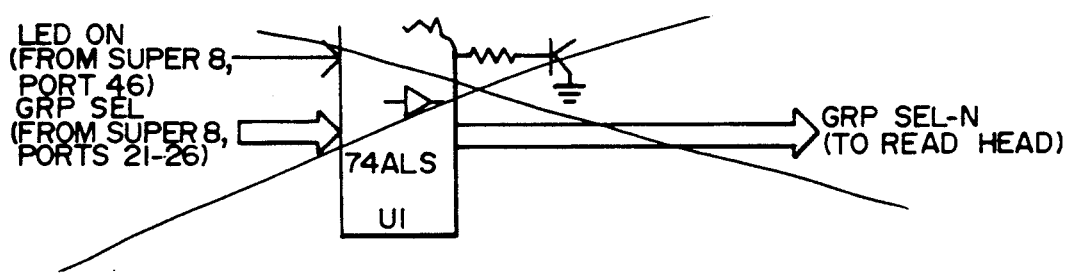

OPPOSITE SURFACE SCANNING OF A MARK SENSE FORM

RELATED APPLICATION

This application is a continuation of application Ser. No. 07/738,856, filed Jul. 31, 1991, now abandoned.

TECHNICAL FIELD

The present invention relates to optical mark readers and to the mark sense forms scanned by such optical mark readers. More particularly, the present invention relates to a method, apparatus and system, including an optical mark reader and a mark sense form, for accomplishing the opposite side scanning of a mark sense form having timing marks on only one side of the form and scannable information on the opposite side of the form from the timing marks or on both sides of the form. Throughout this specification the term "side," when used in reference to a mark sense form, refers to a surface of a mark sense form, the form having two opposed, parallel surfaces. Thus, references to a "first side" and a "second side" or "one side" and the "other side" designate one surface and the surface opposite and parallel to that one surface.

PRIOR ART

Optical mark reading (OMR) systems for scanning documents, sheets or forms for the presence or absence of response marks are well known in the prior art (e.g., U.S. Pat. No. 4,300,123). The scannable documents for use in OMR systems are sheets of paper or other similar material (hereinafter referred to as mark sense forms) that have a plurality of preprinted timing marks or other machine-readable control information in a control mark column (often referred to as a timing track) and a plurality of response areas located on the sheet in a specified relationship with the timing marks. As used within the present invention, the term response area is used to define the locations on the scannable form where the optical mark reader will scan to detect the presence or absence of a data mark made by a respondent. The term response bubble is used to define the printed indicia (e.g., bubble, outline, square, dashed line, etc.) which appear on the scannable form to indicate to the respondent where the respondent should locate the data mark for the response area associated with that response bubble. The timing marks are used to trigger the optical mark reader of the OMR system to scan or "read" the corresponding response area(s) to detect whether a data mark has been made by the respondent within the response bubble(s) for that response area.

Unlike typical character recognition systems, OMR systems use the timing track to aid in the scanning of the information contained on the mark sense form. The timing track allows for variation in the throughput speed of the form while processing the mark sense form. In addition, the use of the timing track allows the data in the response areas to be evaluated during the time period between successive timing marks, rather than waiting until the entire document has passed under the scanning read head before evaluating the information. This greatly increases processing speeds. Finally, the use of the timing track provides a means of accommodating for paper growth or shrinkage without degrading the scanning efficiency of the system. Thus, it will be recognized that preprinting the timing tracks on a mark sense form is a necessary and integral part of current OMR systems.

The process of preprinting the timing track on a mark sense form has changed over the year. Originally, mark sense forms were produced using a sheet printing process. Unfortunately, the sheet printing process was limited in the number of forms that could be produced per hour per press. In addition, the sheet printing process could only print one side of the form at a time, making printing of dual sided forms a very labor intensive and error prone process. Because of these inherent limitations, almost all mark sense forms are now printed using a conventional web printing process. Although the use of the web printing process has allowed for high volume production of mark sense forms, including dual sided mark sense forms, the web printing process has introduced other limitations into the printing of mark sense forms.

Generally, there are two types of OMR systems: reflective read OMR systems that sense light that is reflected from the mark sense form, and transmitted read OMR systems that sense light that is transmitted through the mark sense form. When a web printing process is used for printing all kinds of transmitted light type forms and those reflected light type forms with scannable information on both sides of the form, the timing tracks must be printed on both sides of the mark sense form. For the transmitted light type forms, the timing marks are printed on both sides of the form because the light spectrum characteristics of transmitted light OMR scanners is such that present inks are not dark enough to guarantee an acceptable percentage of reads if the timing track was printed using the web printing process on only one side of the form. For the reflected light type forms, there is no capability in present reflected light OMR scanners to read the response areas on one side of a form without the corresponding timing track information being preprinted on the same side of the form.

Because of the increased capacity of dual sided forms in terms of response areas, the majority of mark sense forms produced today utilize a dual sided format. The requirement that each side of the current mark sense forms be provided with a timing track increases the printing costs and the printing registration problems associated with producing dual sided forms. Unlike the response bubbles or the text that may be printed on a mark sense form, the timing track must be printed with high quality ink in a precise relationship to the edges of the mark sense form. In addition, present OMR systems for scanning dual sided mark sense forms must be equipped with an entire set of light receptors or scanners for each side of the form, or the mark sense form must be run through the OMR system twice keeping track of which side of the form is being scanned. Beyond the increased costs of both the forms and the scanners, the requirement of print codes and timing tracks on each side of the form for dual sided scanning increases printing production costs and potential scanning problems for such forms. Finally, the existence of a timing track on each side of the mark sense forms is aesthetically unpleasing and limits the manner in which the mark sense form can be designed and utilized.

Accordingly, it would be desirable to provide a method, apparatus and system for opposite side scanning of a mark sense form that did not require a timing track to be printed on the same side of the form as the response areas to be scanned. It would also be desirable to provide for dual sided scanning of a mark sense form having a timing track on only one side of the form. Finally, it would be desirable if such a system was also capable of scanning existing mark sense forms having timing tracks and response areas on the same side of the form so that it would be compatible with existing OMR systems and mark sense forms.

SUMMARY OF THE INVENTION

In accordance with the present invention, a method, apparatus and system are provided for opposite side scanning of a mark sense form. The present invention includes both a mark sense form and an optical mark reader that operate together as an optical mark reading system to accomplish the opposite side scanning of the mark sense form.

The opposite side scanning mark sense form comprises a sheet of material having a timing track preprinted on only one side of the sheet and one or more response areas located on the opposite side of the sheet, or on both sides of the sheet, in a predetermined relationship to one of the timing marks in the timing track. The timing track consists of a plurality of preprinted timing marks typically arranged in a control column oriented along an edge of the sheet parallel to the direction in which the form travels through the optical mark reader. Each response area may include an associated response bubble printed as an outline for the user to selectively mark data marks on the mark sense form.

The opposite side scanning optical mark reader comprises a first scanning means for scanning the timing track and response areas on one side of the form, a second scanning means for scanning response areas on the other side of the form and means for producing an enabling signal from the timing track on the one side of the form such that the second scanning means scans the response areas on the other side of the form in response to the enabling signal. The means for producing the enabling signal may be implemented using hardware, software, or a combination of both hardware and software. For example, a microprocessor executing a software routine could be operably connected to the first and second scanning means to produce the enabling signal for the second scanning means in response to the scanning of the timing track by the first scanning means.

Alternative embodiments of the present invention use an additional scanning means as the means for producing the enabling signal. In one embodiment, a first scanning means scans the timing track and produces an enabling signal in response to the timing track on the form and a second and third scanning means scan the response areas on the respective sides of the form in response to the enabling signal from the first scanning means. In another embodiment a first scanning means scans the timing track and response areas on one side of the form and a second scanning means scans the timing track again to produce an enabling signal that is then used by a third scanning means for scanning the response areas on the other side of the form. In this embodiment, the second scanning means is spaced apart from the first scanning means by a predetermined interval so that the first and third scanning means do not overlap scanning of both sides of the form. This stagger between scanning of the two sides of the form is necessary to prevent false reads or missed response bubbles because of light transmitted through the form that may cause improper scanning by the scanning means on the other side of the form.

The OMR system of the present invention that is comprised of the opposite side scanning optical mark reader and mark sense form is backward compatible with existing mark sense forms. The existence of both the first and second scanning means allows the OMR system of the present invention to scan all four possible combinations of timing tracks and response areas printed on a mark sense form, including (1) timing track and response area on the same single side of the form; (2) timing track on one side and response area on the opposite side of the form; (3) timing track on one side and response areas on both sides of the form; and (4) timing tracks and response areas on both sides of the form.

A primary objective of the present invention is to provide a method, apparatus and system for opposite side scanning of a mark sense form that does not require a timing track to be printed on the same side of the form as the response areas to be scanned.

Another objective of the present invention is to provide a method, apparatus and system for opposite side scanning of a mark sense form that does not require a timing track to be printed on both sides of a dual sided mark sense form.

An additional objective of the present invention is to provide an OMR system that is capable of scanning existing mark sense forms having timing tracks and response areas on the same side of the form, as well as being capable of scanning mark sense forms having the timing track on the opposite side of the form from the response area so that the OMR system is compatible with existing OMR systems and mark sense forms.

These and other objectives of the present invention will become apparent with reference to the drawings, the description of the preferred embodiment and the appended claims.

DESCRIPTION OF THE DRAWINGS

FIG. 7 is a block diagram of the head controller board of the preferred embodiment of the present invention.

DESCRIPTION OF THE PREFERRED EMBODIMENT

Figure 1:
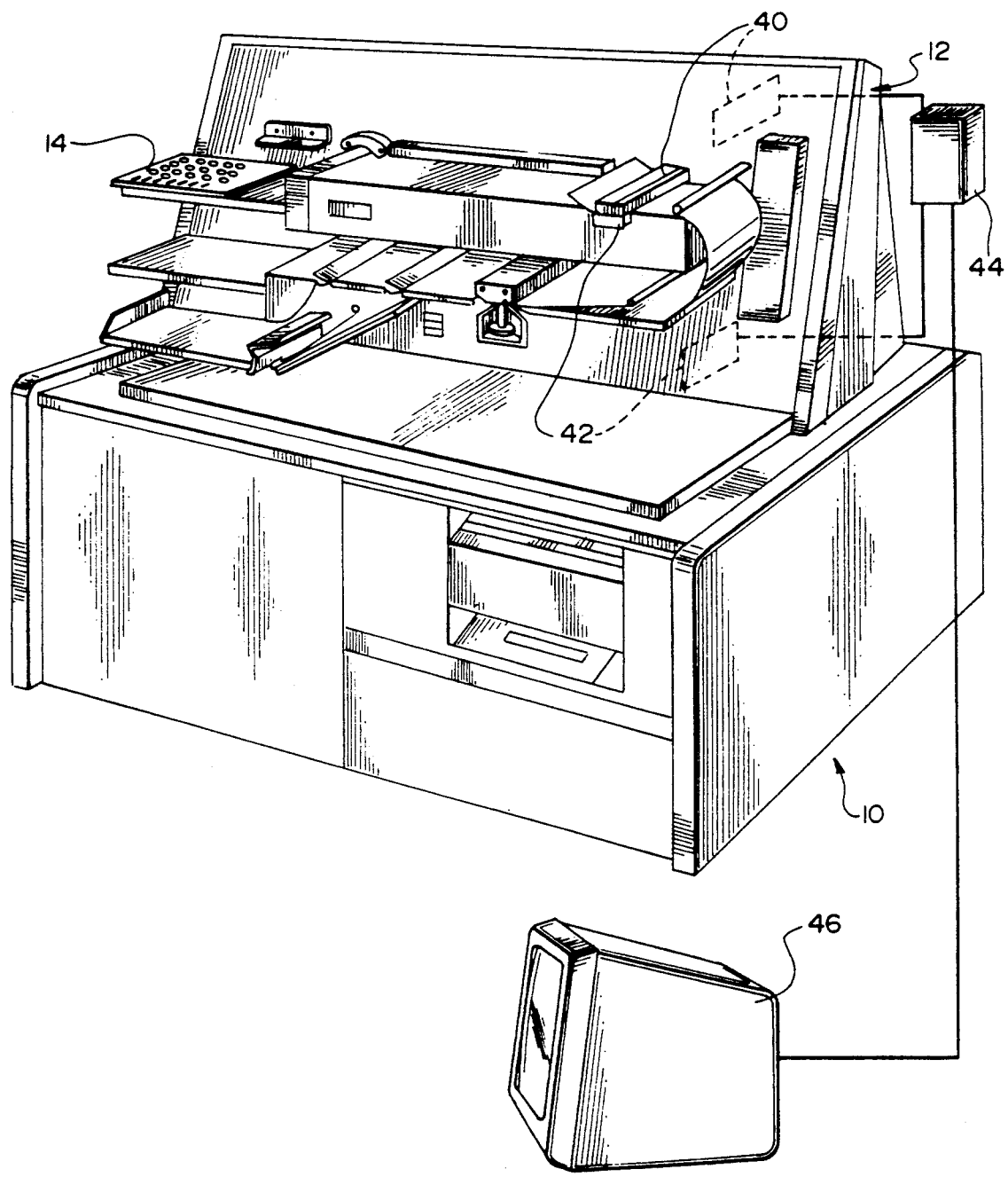
FIG. 1 is a pictorial illustration of the preferred embodiment of an opposite side OMR system, including an optical mark scanner and mark sense form in accordance with the present invention.

Referring to FIG. 1, the preferred embodiment of an OMR system 10 in accordance with the present invention will be described. Like present optical mark reading (OMR) systems, the essential components of the OMR system 10 of the present invention consist of an optical mark scanner 12 and a mark sense form 14. For purposes of describing the preferred embodiment, it is assumed that the reader possesses a basic familiarity with present OMR systems, such as the OpScan ® 21 optical mark scanner available from National Computer Systems, Inc. ("NCS"), Minneapolis, Minn., the assignee of the present invention. For a more detailed description of the operation of the OpScan ® 21 optical mark scanner, reference is made to the *System Installation Guide for the OpScan 21 Scanner*, NCS Publ. No. 202 160 883 (1988); and the *Maintenance Manual for the OpScan 21 Scanner*, NCS Publ. No. 202 160 123 (1988).

Figure 2:
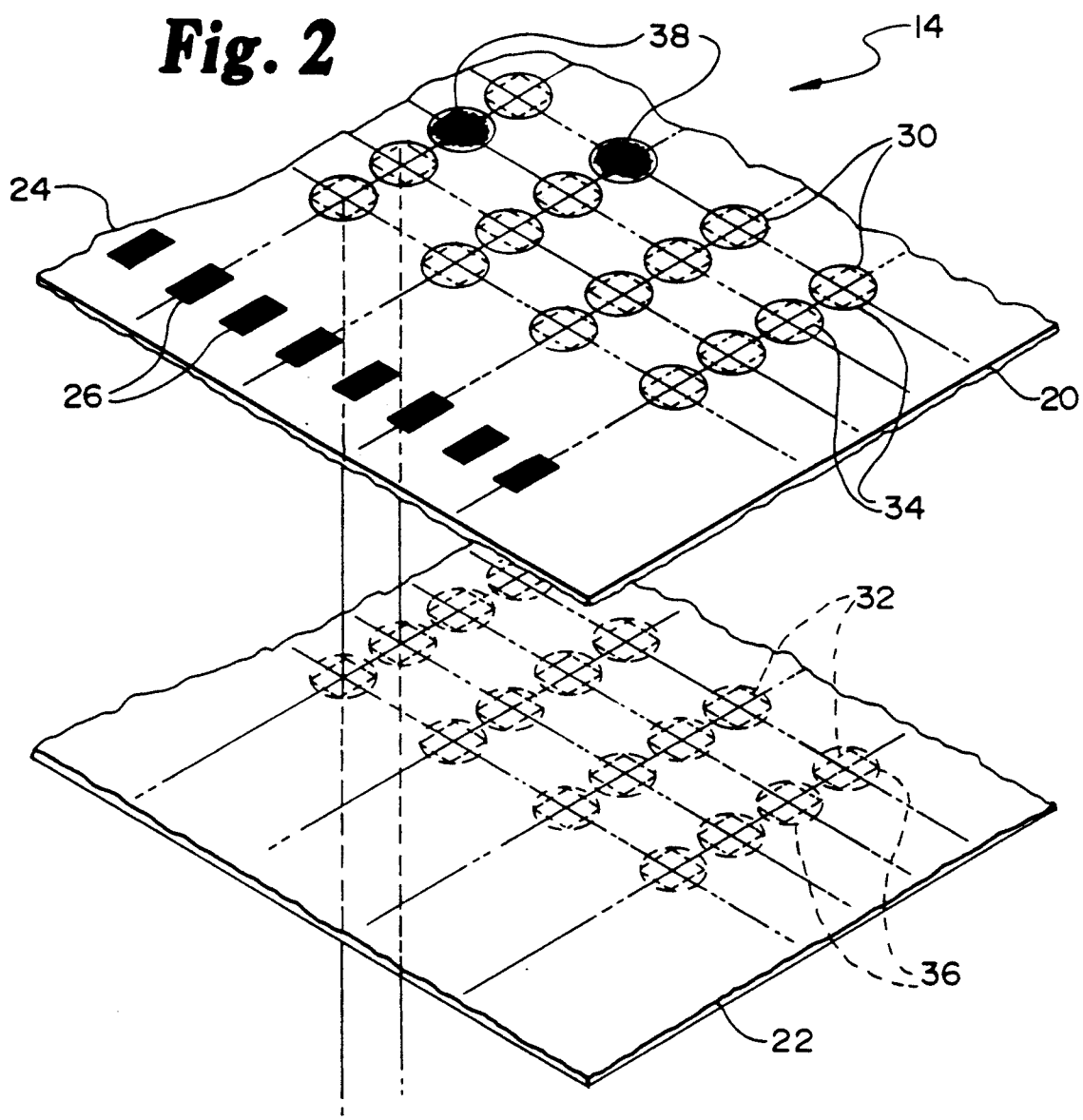
FIG. 2 is an isometric view of the mark sense form of FIG. 1 in which the form is shown divided in half along a plane parallel to the form to more easily represent the first and second side of the form.

As shown most clearly in FIG. 2, the mark sense form 14 is a sheet of material having a first side 20 and second side 22. In this figure, the mark sense form 14 is shown divided in half along a plane parallel to the form to more easily represent the first side 20 and the second side 22. In the preferred embodiment, a timing track 24 consisting of a plurality of timing marks 26 is preprinted on only the first side 20. A plurality of response areas 30, 32 are shown on the first side 20 and in phantom on the second side 22, respectively. The response areas 30, 32 represent the area on the form 14 that is aligned in a predetermined relationship with one of the timing marks 26 such that scanning of the response area 30, 32 will occur in response to the scanning of that timing mark 26. Each of the response areas 30, 32 may be provided with an associated preprinted response bubble 34, 36 that serves as an outline for the user in selectively marking the data marks 38 to be scanned by the optical mark scanner 12. As is well known in the art, the response bubbles 34, 36 may be of any size or shape consistent with the size and shape of the response areas 30, 32 and the intended size and shape of data mark 38 to be scanned by the optical mark scanner 12. Typically, the response bubbles 34, 36 will be slightly larger than the actual response areas 30, 32 to increase the likelihood of properly detecting the presence or absence of a data mark 38 within the response area 30, 32.

As in the prior art, the timing marks 26 operate to signal or trigger the optical mark scanner 12 to scan or "read" one of a plurality of response areas 30, 32 associated with each timing mark 26 for purposes of detecting the presence or absence of a data mark 38. The marks 38 may be provided by a user selectively marking the form 14 for purposes of completing a test or survey, for example using a No. 2 pencil to complete a standarized academic test. Alternatively, the marks 38 may be machine printed in the response areas 30, 32 for purposes of recording predetermined information on the form that is to be scanned along with one or more user-provided data marks.

In the preferred embodiment, the timing marks 26 are arranged in a control column oriented along an edge of the form 14 parallel to the direction in which the form 14 travels through the optical mark scanner 12. For purposes of the present invention, it is assumed that the form 14 will be transported past a stationary optical mark scanner 12 in the direction in which the form 14 is scanned. It will be recognized, however, that it is also possible for the form 14 to remain stationary and for the read head of the optical mark scanner 12 to be moved past the form to achieve the same result of scanning the form 14 in a given direction.

Figure 3:
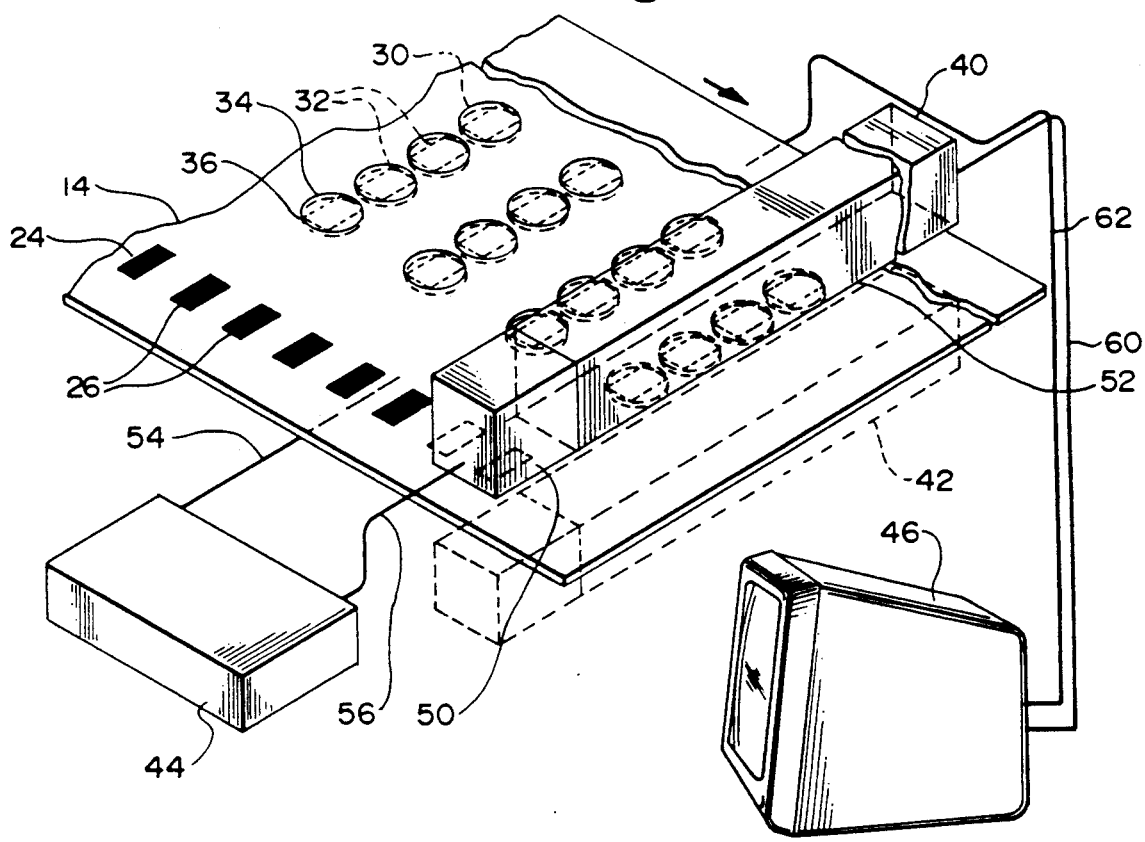
FIG. 3 is a more detailed cut-away block diagram representation of an opposite side OMR system in accordance with FIG. 1.

Referring now to FIGS. 1 and 3, the optical mark scanner 12 of the preferred embodiment will be described in greater detail. The optical mark scanner 12 is comprised of a first scanning means 40, a second scanning means 42, means for producing an enabling signal 44, and processing means 46 for collecting the scanned information produced by the first and second scanning means 40 and 42. In FIG. 3, the response areas 32 and associated response bubbles 36, along with the second scanning means 42 that are associated with the second side 22 of the form 14 are shown in hidden lines. In this embodiment, the first scanning means 40 includes both a control scanning means 50 for scanning the timing track 24 and a response scanning means 52 for scanning the response areas 30 on the first side 20 of the form 14. Both the control scanning means 50 and the response scanning means 52 are of the type of photocell scanners that are well known in the art. The direction that the form is traveling with respect to the scanning means 40, 42 is indicated in FIG. 3.

The means for producing an enabling signal 44 generates an opposite side enabling signal 54 that represents the scanning control information 56 derived from the timing track 24 as scanned in this embodiment by the control scanning means 50. Unlike prior art OMR systems in which only the scanned information 60 from the first side 20 of the form 14 is generated in relation to a timing mark 24 on the same side of the form, the second scanning means 42 of the present invention also scans the response areas 32 on the second side 22 in response to the opposite side enabling signal 54. The result is that the scanning control information 56 derived from the timing track 24 printed on the first side 20 of the form 14 is used to control the generation of scanned information 62 from the response areas 32 on the opposite side of the form, second side 22, via the means for producing an enabling signal 44.

For purposes of the present invention, the "scanning" of the second side 22 that is controlled by the opposite side enabling signal 54 may be accomplished in a variety of methods, all of which are intended to be within the scope of the present invention. For example, in older optical mark scanning systems, the scanning control information 56 generated from the timing track 24 was used as a pulse width drive signal to physically gate the analog electrical output of a line of photocells arranged above the response area. In some of these systems, there was a slight stagger between the longitudinal center of the timing marks and the longitudinal center of the response area to allow for the electromechanical switching associated with gating the analog output signals. In some of the newer optical mark scanning systems, the processing means 46 simultaneously collects the scanning information 60 and the scan control information 56. A software routine is then used to "overlay" the scan control information 56 on the scanning information 60 in order to determine when the scanning information 60 represents valid information from a response area 30. In each of these situations, the opposite side enabling signal 54 would replicate the same control functions as the control information 56 that is generated from the timing track 24.

Figure 4:
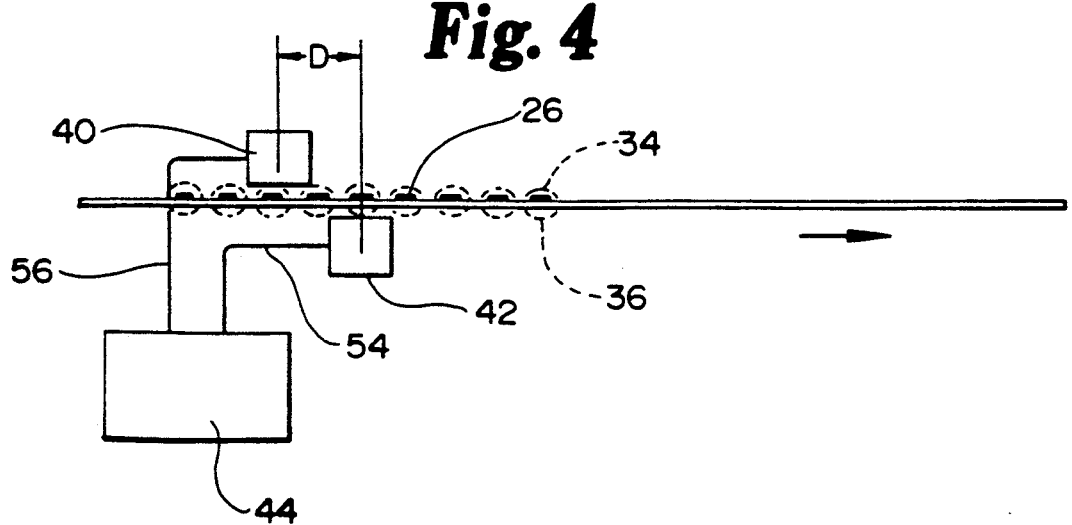
FIG. 4 is a side view showing selected elements of the optical mark scanner and the mark sense form.

The side view of one embodiment of the present invention as shown in FIG. 4 demonstrates the relationship of the means for producing an enabling signal 44 to the other elements of the invention. In this embodiment, the timing marks 26 and the response bubbles 34, 36 are shown as having an exaggerated vertical dimension for ease of representation. In this embodiment, as in FIG. 2, the response bubbles 34, 36 are concentrically aligned on the both sides of the form 14. The first scanning means 40 and the second scanning means 42 are separated longitudinally along the direction of travel of the form 14 by a distance D. This separation is necessary to prevent crosstalk or overlap between the light sources and photocells of the respective scanning means. The means for producing an enabling signal 44 will effectively delay the scanning control information 56 by the necessary time represented by the separation distance D before generating the opposite side enabling signal 54 to control the scanning of the second side 22 of the form 14.

Figure 5:
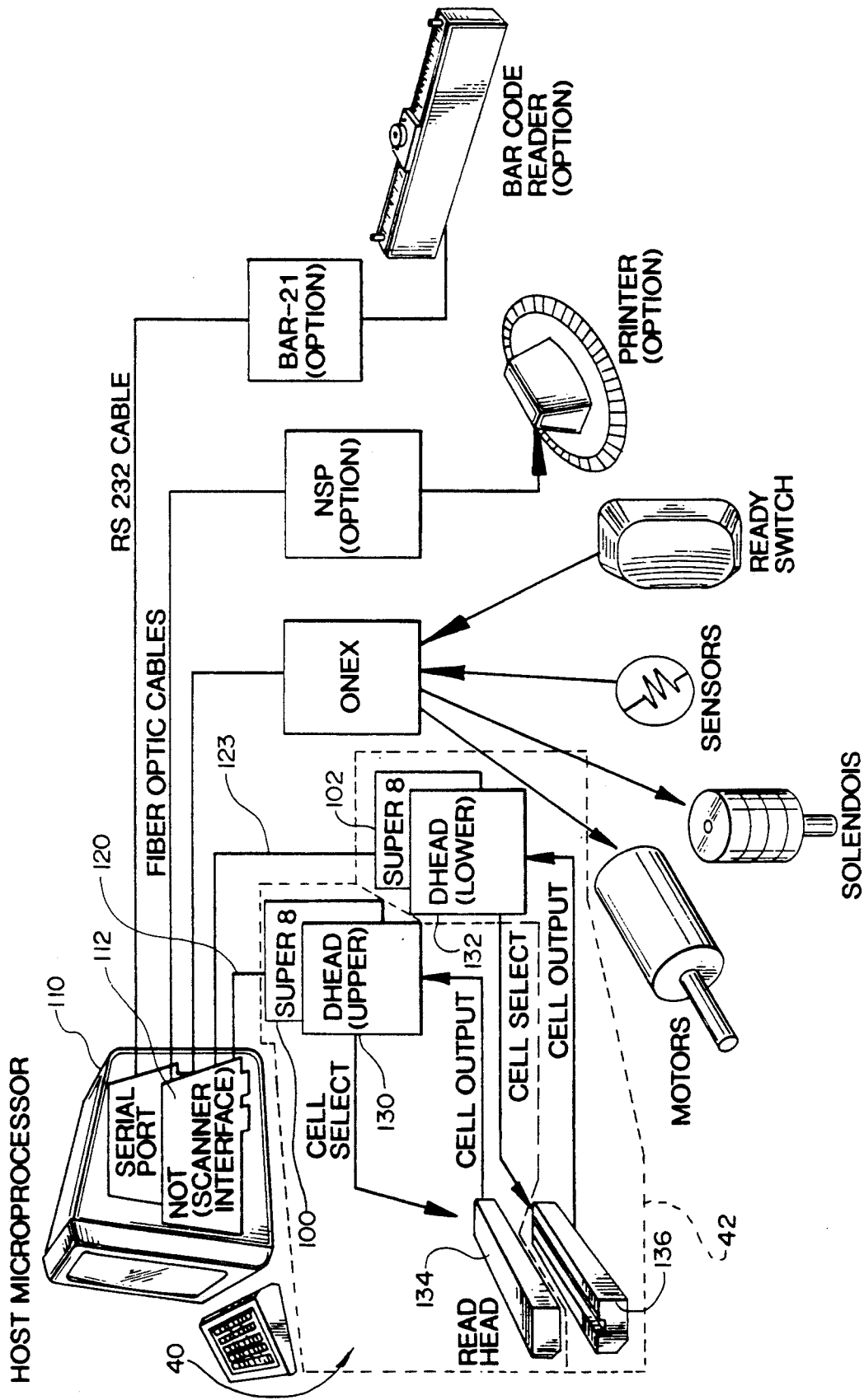
FIG. 5 is a block diagram of the preferred embodiment of the OMR scanner in accordance with the present invention.

Referring now to FIG. 5, the preferred embodiment for producing the enabling signal used to control the opposite side scanning of the present invention will be described. In the preferred embodiment, an OpScan ® 21 optical mark scanner is modified in accordance with the present invention. The OpScan ® 21 optical mark scanner utilizes a pair of microprocessor boards 100 and 102 to control the operation of the first scanning means 40 and second scanning means 42, respectively, and an IBM/AT compatible microcomputer 110 as the processing means 46. The microprocessor boards 100 and 102 are connected via fiber optic communications links 120 and 122, respectively, to the microcomputer 110. In the preferred embodiment, the microcomputer 110 is equipped with a network optical transmitter (NOT) board 112 for handling communications over the fiber optic communications links 120 and 122.

Figure 8:
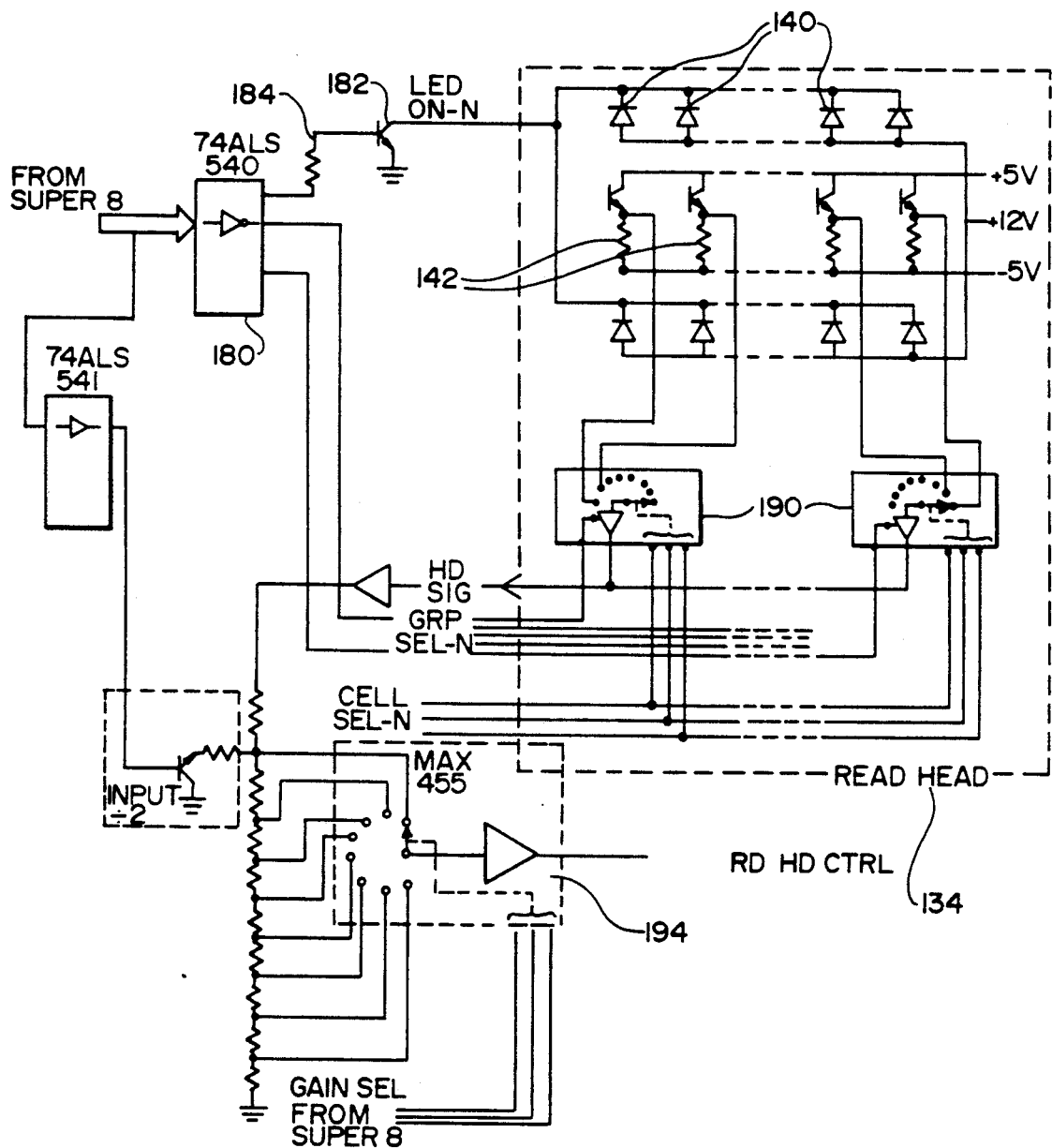
FIG. 8 is a schematic diagram of the read head control operation used to control the scanning of the read head means.

In addition to the microprocessor boards 100 and 102, the first and second scanning means 40 and 42 of the preferred embodiment include head controller boards 130 and 132, respectively, and read means 134 and 136, respectively. In the preferred embodiment as shown in FIG. 8, the read head means 134 is comprised of a set of corresponding LEDs 140 and photocells 142 arranged in a linear fashion perpendicular to the direction of travel of the form 14. In this embodiment, the read head means 134 consist of 48 pairs of LEDs 140 and photocells 142 organized in six sets of 8 pairs. For purposes of selection and decoding of the scanned data, each set is referred to as a "Group" and each pair of LEDs 140 and photocells 142 is referred to as a "Cell" (e.g., Group 1, Cell 2).

Figure 6:
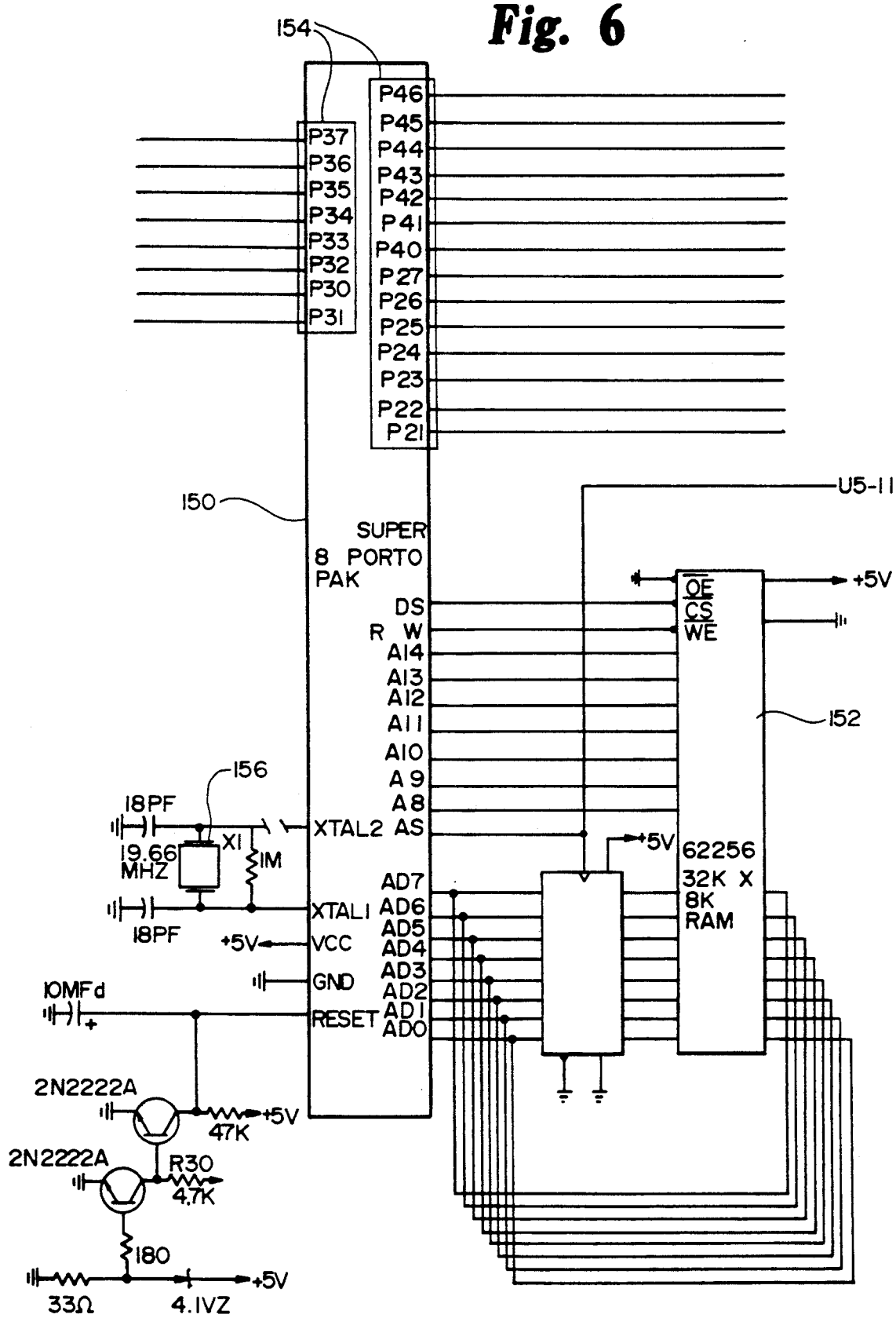
FIG. 6 is a schematic diagram of the preferred embodiment of the scanning means of the present invention.

As shown in FIG. 6, the microprocessor board 100 is comprised of a Zilog Super8 microprocessor 150 which executes a control program loaded into a 8K RAM memory 152 by the microcomputer 110 at power up. The Super8 microprocessor 150 also includes an internal 8K ROM memory which contains program code that downloads the control program from the microcomputer 110 at power up. Three 8-bit ports 154 are used as intercommunication paths between the microprocessor board 100 and its associated logic boards such as the head controller board 130. A 19.6608 MHz crystal oscillator 156 provides the Super microprocessor 150 with an operating clock speed of 9.8304 MHz. The microprocessor board 100 includes a reset circuit means 160 comprised of two 2N2222 transistors 162, a 4.1 V zener diode 164 and other related parts. A 74HTC573 octal latch 166 provides the lower eight bits of the address to memory during the last half of the instruction cycle.

As shown in FIG. 7, an HFBR24524 fiber-optic receiver 170 on the microprocessor board 100 accepts data from the NOT board 112 that has been transmitted over the fiber optic communications link 120. The fiber-optic receiver 170 then amplifies the data and sends it through a 74ALS541 driver 172 to Port 30 of the Super8 microprocessor 150. Data traveling from the Super8 microprocessor 150 to the microcomputer 110 enters from Port 31 of the Super8 microprocessor 150, passes through a 74ALS541 driver 172 and is then transmitted by a HBFR1524 fiber-optic transmitter 176 over the fiber optic communications link 120 to the NOT board 112. The NOT board 112 includes similar hardware for transmitting and receiving data over the fiber optic communications links 102 and 122.

FIG. 7 shows a block diagram of the head controller board 130 and FIG. 8 shows a schematic diagram of the read head control operation used to control the scanning of the read head means 134. Port 46 of the Super8 microprocessor 150 controls the on/off state of the LEDs 140 by way of a 74ALS540 octal line driver 180 and a 2N2222 transistor 182. A small series resistor 184 provides bias to the transistor 182 so that a high signal from Port 46 of the Super8 microprocessor 150 causes the signal LED ON-N to go low, thereby turning on the LEDs 140. In contrast to most NCS scanners where the read head LEDs are turned on in successive groups of (usually) eight LEDs at a time across the read head for each timing mark, all of the LEDs 140 in the preferred embodiment are turned on when leading edge of the form 14 is expected at the read head means 134 and remain on until the trailing edge of the form 14 has passed beyond the read head means 134.

Although the LEDs 140 remain on at all times while the form 14 is under the read head means 134, the multiplexers 190 in the read head means 134 that handle the output from the photocells 142 in the read head means 134 are turned on one at a time during each of five to seven "scans" associated with each timing mark 26. This is controlled by the GRP SEL 0-N to GRP SEL 5-N signals from the Super8 microprocessor 150. These signals are sent from Ports 40 through 45 of the Super8 microprocessor 150 and pass through a 74ALS541 octal line driver 172 and then out to the read head means 134. Only one of the six signals will be low at any given moment, thereby enabling one of the six multiplexers 190. If no Group is being read, then all six signals will be high.

At the same time that the GRP SEL-N signals are activated to select the multiplexers 190, three other signals are routed to the multiplexers 190. These are the CELL SEL-N signals that determine which one of the eight photocell outputs is to be gated through the selected multiplexer 190. These signals do not originate from the Super8 microprocessor 150, but instead are generated from the Cell/Gain Select Table. Also happening at the same time, and also originating from the Cell/Gain Select Table, an additional three signals are being applied to the control input of the MAX455 video multiplexer/amplifier 194 to select one-of-eight possible scalings of the input value supplied from the photocell 142. This scaling of input is done because it is impossible to guarantee that all photocells 142 will have the same pattern of response to the light from the LEDs 140. It allows a correction factor to be supplied to the incoming signal for each photocell 142. In the preferred embodiment, the Cell/Gain Select Table combines both cell addressing and the gain correction in one byte of the table, so that the proper bits for cell selection and gain correction can be made available to the multiplexer logic at the same instant.

In the preferred embodiment, the control program loaded into the microprocessor boards 100 and 102 establishes a master side board and a slave side board. Both of the read head means 134 and 136 of the optical mark scanner 12 are equipped with LEDs 140 and photocells 142 for sensing the timing marks 26; however, in the preferred embodiment the timing marks 26 are read by the first scanning means 40 which is loaded with the master side board control program. Alternatively, the control program could be programmed for each microprocessor board to attempt to detect whether its side of the form 14 contained the timing marks 26 in order to establish the master side board orientation, or the form 14 could be scanned for the presence of preprinted identification marks (sometimes referred to as skunk marks) indicating the master side board orientation.

For the master side board, Port 47 of the Super8 microprocessor 150 is programmed to send the opposite side enabling signal 54 from the microprocessor board 100. The opposite side enabling signal 54 is generated when the microprocessor board 100 first detects a valid Group 6, Cell 7 signal (the timing mark photocell). It is repeated each time a valid Group 6, Cell 7 signal is detected for a new timing mark 26. By generating the opposite side enabling signal 54 in this manner, the present invention is able to control the scanning of the scanned information 62 in real time as the scanning occurs on the second side 22 of the form 14. There is no need to store all of the scanned information 62 in order to process that information at a later time. This results in a significant decrease in the amount of information which must be stored by the optical mark scanner 12, thereby allowing for faster processing of forms at a higher rate of throughput. In addition, in the preferred embodiment, the generation of the opposite side enabling signal in real time allows the preferred method of compensating for variations in photocells 142 to be used without the need for additional modification, and without requiring that the compensation information be stored along with the scanned information for later processing.

Port 47 on the Super8 microprocessor 150 for the slave side board, microprocessor board 102, is programmed to receive the opposite side enabling signal. The control program for the slave side board includes additional control logic to enable the Super8 microprocessor to generate the necessary GRP SEL-N signals in response to the opposite side enabling signal 54. In addition, the control program may be provided with a delay compensation routine to adjust for the offset in response areas between first side 20 and second side 22 of the form 14. The delay compensation routine can also be used to adjust for timing delays in providing the opposite side enabling signal 54 to the slave side processor. Both positive and negative adjustments to the opposite side enabling signal are possible.

Figure 9A:
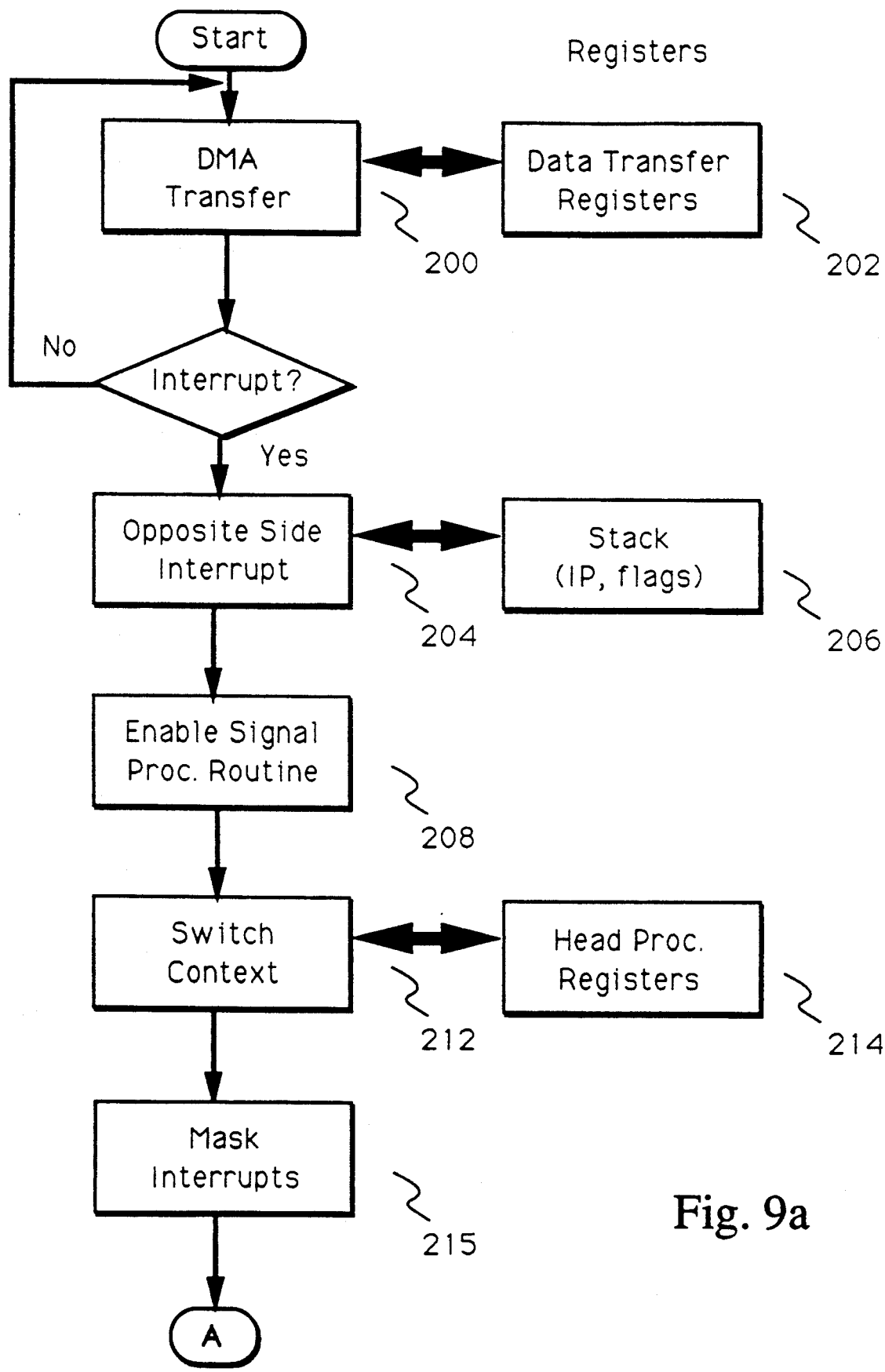
FIGS. 9a and 9b are flowcharts of the software program in the slave side microprocessor board for handling interrupts caused by the opposite side enabling signal.
Figure 9B:
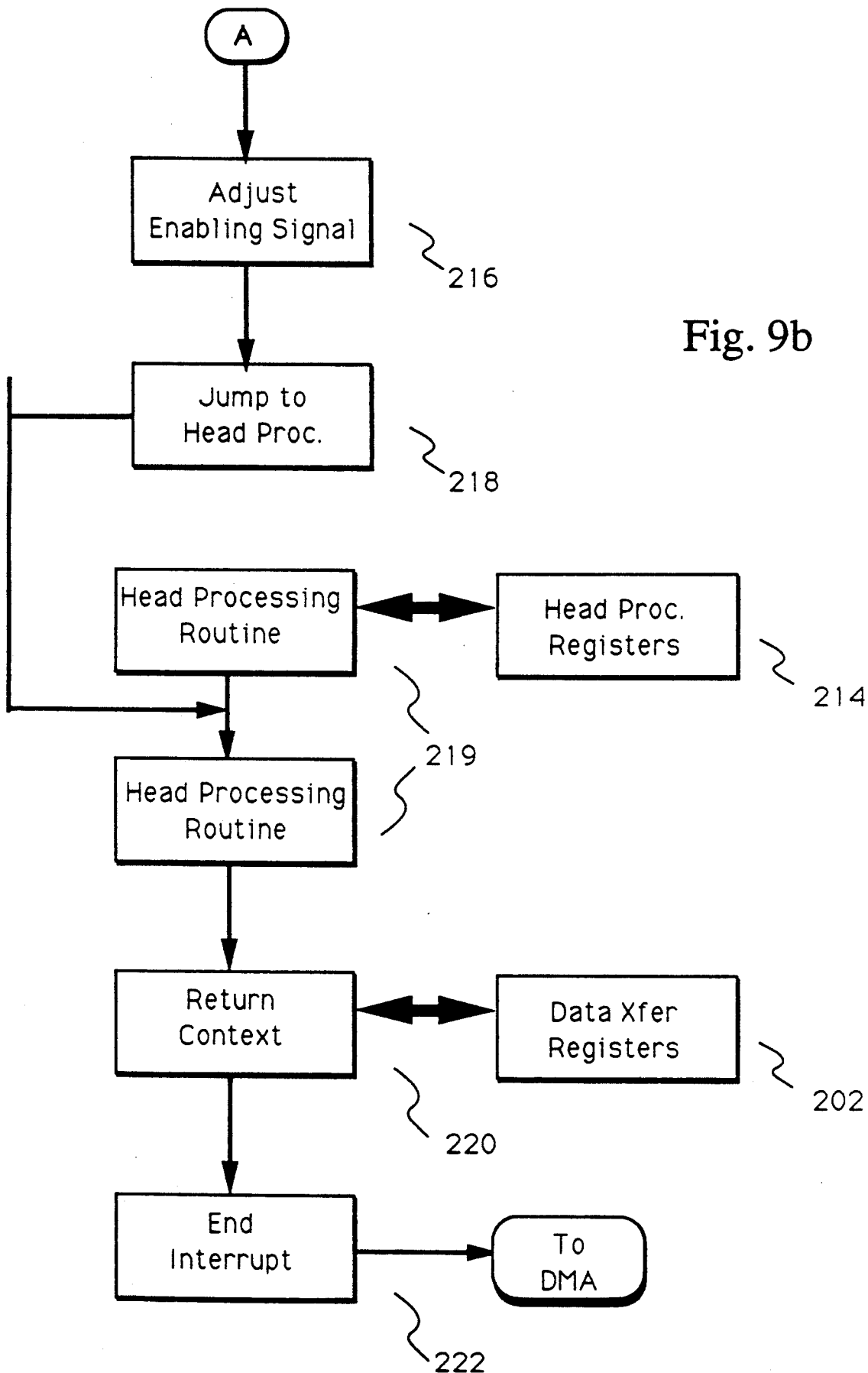

Referring now to FIGS. 9a and 9b, a flow chart for the enabling signal software routine in slave side microprocessor board will be described. For purposes of describing the software program implemented in the slave side board, a familiarity with the architecture and programming techniques of the Zilog Super8 microprocessor is assumed. For a more detailed description of the architecture and programming techniques of the Zilog Super8 microprocessor, reference is made to the Zilog Super8 data book, available from Zilog, Inc. In the preferred embodiment, the software programs in both the master side board and the slave side board take advantage of the fast context switching capabilities of the Super8 microprocessor by assigning different groups of registers to different "purposes" within the program. For example, in the situation where the slave side microprocessor board 102 is in the process of sending data to the microcomputer 110 at DMA Transfer 200, a first group of working registers, the data transfer register group 202, is used to store such values as the read buffer start address, stop address and other parameters need by the DMA controller of the Super8 microprocessor.

When the opposite side enabling signal 54 arrives as an interrupt at port 47 of the slave side microprocessor 102 at Opposite Side Interrupt 204, a Fast Interrupt is generated in the Super8 microprocessor. Rather than taking the time to store all of the data transfer values and parameters into memory and then loading the microprocessor with the necessary values to process the scanning of the response areas in response to the opposite side enabling signal 54, the Opposite Side Interrupt 204 causes the present values in Instruction Pointer and the CPU flags of the Super8 microprocessor to be pushed onto a stack at 206, after which the Instruction Pointer is loaded with the address of an Enabling Signal Processing Routine at 208. The use of the Fast Interrupt allows for processing of the interrupt in six clock cycles (600 nanoseconds), instead of the usual twenty-two clock cycles (2.2 microseconds).

At Switch Context 212 a second group of working registers, the head processing register group 214, is activated and the data transfer register group 202 is deactivated. At Mask Interrupts 215, the interrupts of the Super8 microprocessor are masked so as to allow the head processing routine to proceed without interruption except for unrecoverable errors. At Adjust Enabling Signal 216, the software program makes any timing adjustments or parameter changes necessary for processing the enabling signal 54 as if it were a valid timing mark detected from the instant side of the scannable form, in this case the side being scanned by the slave side microprocessor board. At Jump to Head Processing Routine 218, control is now transferred into the standard head processing routine just after the point at which the Head Processing Routine 219 would have made the context switch to the Head Processing Register Group 214. When the Head Processing Routine 219 is completed, Return Context 220 causes the register groups to be switched back to the Data Transfer Register Group 202. At End Interrupt 222, an end-of-interrupt signal causes the Super8 microprocessor to restore the Instruction Pointer and CPU flags of the Super8 microprocessor from the stack to the values they had before the interrupt, so that the Data Transfer 200, or whatever process was running before, will be resumed just where it left off.

It will be seen that the implementation of the software program for the master side microprocessor board may be accomplished by outputting the opposite side enabling signal 54 to Port 47 at the earliest possible point in the Head Processing Routine 219 of the master side board when a valid timing mark 26 is detected. It will also be recognized that the timing of the Head Processing Routine 219 for the master side board may need to be adjusted to accommodate the additional clock cycles necessary to output the opposite side enabling signal 54 to Port 47, something which could be accomplished by code revision or by slightly increasing the clock speed of the master side microprocessor board.

ALTERNATIVE EMBODIMENTS

Although the preferred embodiment of the optical mark scanner 12 of the present invention is described in terms of a microprocessor implemented delay of the signal generated by the control scanning means 50 to form the opposite side enabling signal 54 for the second side 22 of the form 14, it should be recognized that many alternative forms of generating the opposite side enabling signal 54 for opposite side scanning are intended to be within the scope of the present invention. It will also be recognized that alternative embodiments of the mark sense form 14 having differing combinations of timing marks 26 on one side and response areas 30, 32 on the opposite side or on both side of the form 14 are also intended to be within the scope of the present invention.

Figure 11:
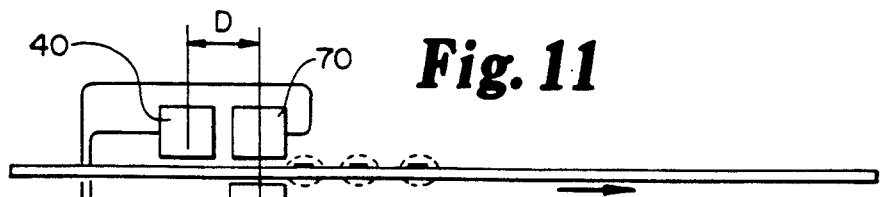
FIG. 11 is a side view similar to FIG. 4 showing an alternate embodiment that utilizes a separate timing track scanner to enable scanning of the second side of the form.

While the optical mark scanner 12 must be provided with a means for providing the enabling signal 44 in response to scanning control information 56, the means for providing the enabling signal 44 may be accomplished in several ways. As shown in FIG. 11, a third scanning means in the form of a second control scanning means 70 may be positioned directly above the second scanning means 32 and longitudinally displaced from the first scanning means 30 by distance D. In this embodiment, the scanning control information 56 is effectively generated twice, once to trigger the scanning of the first side 20 and a second time to trigger the scanning of the second side 22 via the opposite side enabling signal 54.

Figure 12:
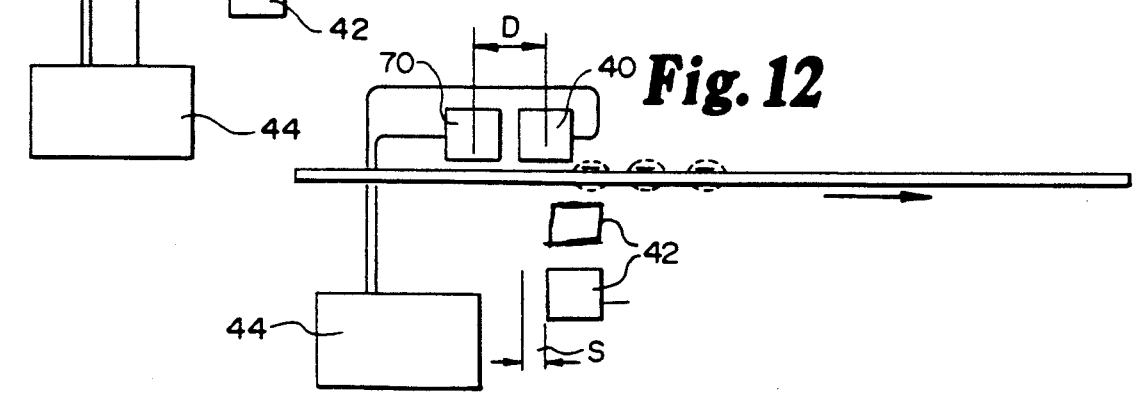
FIG. 12 is a side view similar to FIG. 4 showing another alternate embodiment that utilizes a separate timing track scanner to enable scanning of both the first and the second side of the form.

In another embodiment shown in FIG. 12, a single control scanning means 72 separate from both the first scanning means 40 and the second scanning means 42 is used to generate the scanning control information 56 from the timing track 24. In this embodiment, the scanning control information 56 is delayed for both the first scanning means 40 and the second scanning means 42 in accordance with the physical arrangement and separation of each of the scanning means.

Figure 10:
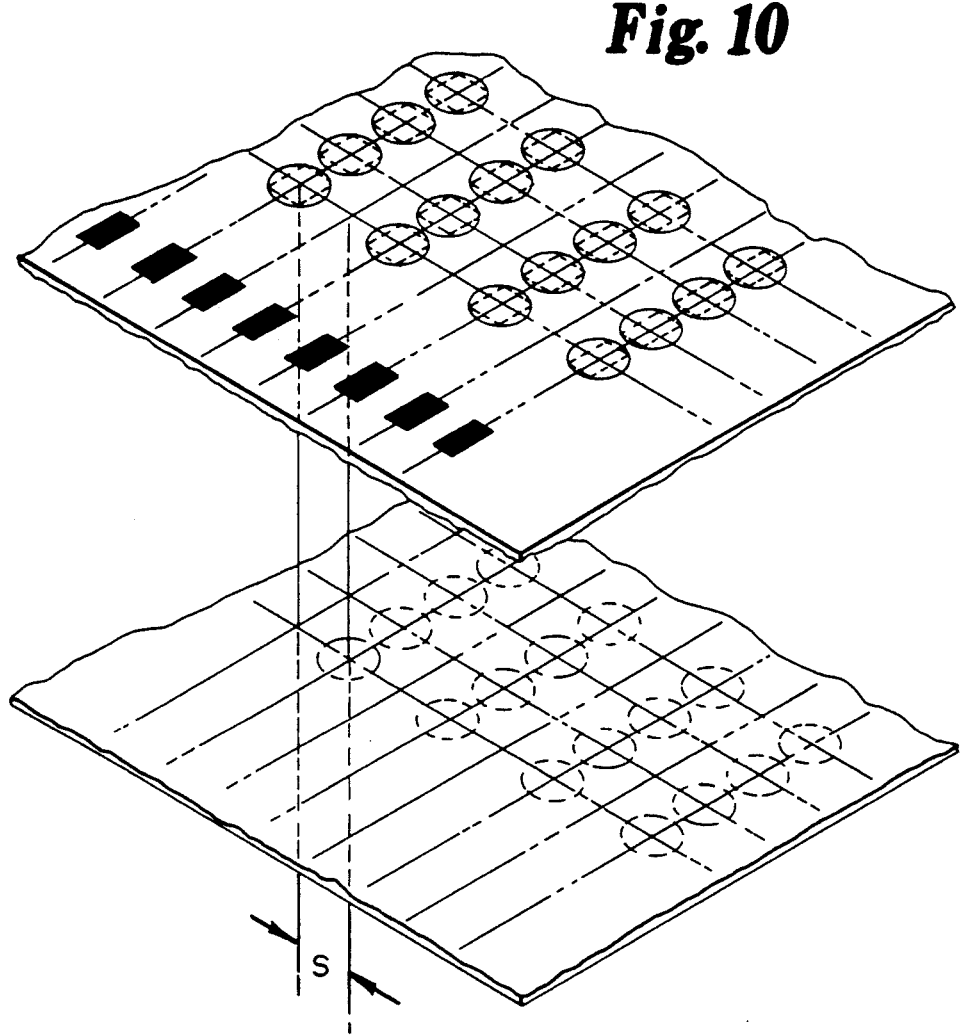
FIG. 10 is an isometric view similar to FIG. 2 showing an alternate embodiment of the mark sense form in which the response areas on the first and second side are not concentrically aligned.

As shown in FIG. 10, it is not necessary for the response bubbles 34 on the first side 20 to be concentrically aligned in registration with the response bubbles 36 on the second side 22. The distance S of separation between response bubbles 34 and 36 as shown by the dashed lines in FIG. 10 can be accommodated by the means for producing the enabling signal 44 such that the proper delay in the opposite side enabling signal is provided in triggering the scanning of data marks 20 on the second side 22 of the form 14. It is also not necessary that response bubbles 34, 36 appear on both sides of the form 14. The response bubbles 36 could appear on one side, the second side 22, and the timing marks 26 can appear on the other side, the first side 20. This arrangement has the practical value that the space formerly occupied by the timing track now becomes available for other purposes. It also provides the aesthetic benefit of eliminating the timing track from the user's view. As to aesthetics, in many situations, if the timing track is located on the back of the sheet from the user's perspective, it will not be seen by the user, because the user has no interest in looking at the back of the form.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

I claim:

1. A mark sense form comprising:
   a sheet of material having a first and a second surface;
   a timing track printed on the first surface of the sheet of material, the timing track including a plurality of pre-printed timing marks in a control column; and
   one or more response bubbles printed on at least the second surface of the sheet of material, each response bubble printed in a predetermined relation to a corresponding response area associated with one of the timing marks,
   whereby an optical mark reader will scan any response areas on both surfaces of the sheet of material in response to the timing track on the first surface of the sheet of material.

2. The mark sense form of claim 1 wherein the response bubbles are printed on both the first and second surfaces of the sheet of material.

3. An apparatus for opposite surface scanning of a mark sense form having a timing track on only one surface of the form and a plurality of response areas on at least the other surface of the form, comprising:
   first scanning means for scanning the timing track and any response areas on one surface of the form;
   means for producing an enabling signal in response to the timing track; and
   second scanning means for scanning the response areas on the other surface of the form in response to the enabling signal from the first scanning means.

4. The apparatus of claim 3 wherein the means for producing the enabling signal is comprised of a detector means for detecting the timing track and an electronic delay means operably coupled to the detector means for delaying the enabling signal by the predetermined amount.

5. The apparatus of claim 3 wherein the means for producing the enabling signal is comprised of a computer processing means operably connected to the first scanning means and the second scanning means for comparing the difference in relative position between the first and second scanning means with the current timing track and producing the enabling signal based upon this comparison.

6. An apparatus for opposite surface scanning of a mark sense form having a timing track on only one surface of the form and a plurality of response areas on at least the other surface of the form, comprising:
   first scanning means for scanning the timing track and producing an enabling signal in response to the timing track on the form;

second scanning means for scanning any response areas on one surface of the form in response to the enabling signal from the first scanning means; and third scanning means for scanning the response areas on the other surface of the form in response to the enabling signal from the first scanning means.

7. An apparatus for opposite surface scanning of a mark sense form having a timing track on only one surface of the form and a plurality of response areas on at least the other surface of the form, comprising:

first scanning means for scanning the timing track and any response areas on one surface of the form;

second scanning means for scanning the timing track and producing an enabling signal; and third scanning means for scanning the response areas on the other surface of the form in response to the enabling signal from the second scanning means, wherein the second scanning means is spaced apart from the first scanning means by a predetermined interval.

8. A method for opposite surface scanning of a mark sense form having a timing track on only one surface of the form and a plurality of response areas on at least the other surface of the form, comprising the steps of:

scanning the timing track and any response areas on one surface of the form;

producing an enabling signal in response to the scanning of the timing track;

delaying the enabling signal by a predetermined amount; and scanning the response areas on the other surface of the form in response to the delayed enabling signal.

9. A method for opposite surface scanning of a mark sense form having a timing track on only one surface of the form and a plurality of response areas on at least the other surface of the form, comprising the steps of:

scanning the timing track and any response areas on one surface of the form;

scanning the timing track a second time and producing an enabling signal; and scanning the response areas on the other surface of the form in response to the enabling signal from the second scanning of the timing track.

10. The method of claim 8 wherein the step of scanning the timing track a second time is spaced apart from the first step of scanning the timing track and response areas by a predetermined interval.

11. In an optical mark reader system in which an optical mark scanner is triggered to detect the presence of data marks in response areas on a sheet by control marks printed on the sheet that indicate the positions of the response areas, the improvement comprising:

printing the control marks on one surface of the sheet; and positioning the response areas to allow for the placement of the data marks on the opposite surface of the sheet.

* * * * *